United States Patent [19]
Van Cleve et al.

[11] Patent Number: 5,679,906
[45] Date of Patent: Oct. 21, 1997

[54] CORIOLIS EFFECT MASS FLOWMETER USING A SINGLE ROTOR HAVING A FLEXIBLE SENSING ELEMENT

[75] Inventors: Craig Brainered Van Cleve, Lyons; Roger Scott Loving, Boulder, both of Colo.

[73] Assignee: Micro Motion, Inc., Boulder, Colo.

[21] Appl. No.: 558,686

[22] Filed: Nov. 16, 1995

Related U.S. Application Data

[63] Continuation-in-part of Ser. No. 404,340, Mar. 15, 1995, abandoned.

[51] Int. Cl.⁶ ........................................... G01F 1/84
[52] U.S. Cl. ........................... 73/861.353; 73/861.79
[58] Field of Search ..................... 73/861.78, 861.79, 73/861.351, 861.352, 861.353, 861.354

[56] References Cited

U.S. PATENT DOCUMENTS

| | | | |
|---|---|---|---|
| Re. 31,450 | 11/1983 | Smith | 73/861.38 |
| 2,832,218 | 4/1958 | White | 73/194 |
| 2,877,649 | 3/1959 | Powers | 73/194 |
| 2,943,487 | 7/1960 | Potter | 73/231 |
| 3,232,110 | 2/1966 | Li | 73/231 |
| 3,350,936 | 11/1967 | Li | 73/194 |
| 3,877,304 | 4/1975 | Vetsch | 73/231 |
| 3,958,447 | 5/1976 | Baker et al. | 73/32 |
| 4,012,957 | 3/1977 | Chiles et al. | 73/231 |
| 4,109,524 | 8/1978 | Smith | 73/194 |
| 4,438,648 | 3/1984 | Cheney, Jr. | 73/195 |
| 4,491,025 | 1/1985 | Smith | 73/861.38 |
| 4,570,497 | 2/1986 | Han | 73/861.79 |
| 4,833,925 | 5/1989 | Bullock et al. | 73/861.79 |
| 5,129,264 | 7/1992 | Lorenc | 73/861.42 |

FOREIGN PATENT DOCUMENTS

| | | |
|---|---|---|
| 0 474 121 A2 | 8/1991 | European Pat. Off. ............ 1/80 |
| 0 579 493 A2 | 1/1994 | European Pat. Off. . |
| 0 485 684 B1 | 6/1994 | European Pat. Off. . |
| 1235608 | 3/1967 | Germany . |
| 0 537 765 A2 | 10/1992 | Germany . |
| 0 537 765 A3 | 10/1992 | Germany . |
| 1069466 | 12/1964 | United Kingdom . |
| WO 94/21990 | 3/1994 | WIPO . |

OTHER PUBLICATIONS

Control Engineering Corp., "Mass Rate Flowmeter Measures Gas, Liquid, Or Solids," *Product Engineering*, Sep. 1953.

Brain, T.J.S., "Mass Flow Measurement Methods," *Metron*, vol. 1., No. 1, Jan. 1969.

Wilson, J.P., Jr., "A Survey of Mass Flowmeters," *Instrumentation Technology*, vol. 18, No. 9, Sep. 1971.

*Primary Examiner*—George M. Dombroske
*Assistant Examiner*—Harshad Patel
*Attorney, Agent, or Firm*—Duft, Graziano & Forest, PC

[57] ABSTRACT

A Coriolis flowmeter having a rotor assembly positioned within a housing and having center axis of rotation. The rotor assembly has a plurality of flow channels, each of which extends from the outer periphery of said rotor assembly to a center recess of said rotor assembly. An inlet extends material through the flow channels to an outlet of the flowmeter. The rotor assembly rotates about the center axis of rotation as the material passes through the flow channels. Coriolis forces generated by the material flowing and the concurrent rotation of the rotor assembly cause a flexure element comprising a part of the rotor assembly to assume an arcuate offset. Strain gauges or sensing coils and magnets generate output signals indicative of the magnitude of the angular offset and the mass flow rate of the flowing material. A motor connected to the rotor assembly can rotate the rotor assembly at an increased velocity to operate the flowmeter as a pump that generates output signals indicative of the pump throughput.

33 Claims, 6 Drawing Sheets

5,679,906

CORIOLIS EFFECT MASS FLOWMETER USING A SINGLE ROTOR HAVING A FLEXIBLE SENSING ELEMENT

RELATED APPLICATIONS

This application is a continuation in part of U.S. application Ser. No. 08/404,340 filed 15 Mar. 1995 now abandoned and whose disclosure is hereby incorporated by reference to the same-extent as if fully set forth herein.

FIELD OF THE INVENTION

This invention relates to a Coriolis effect mass flowmeter and more particularly to a Coriolis effect flowmeter using a rotor as a phase measuring element.

PROBLEM

It is known to use Coriolis effect vibrating tube mass flowmeters to measure mass flow and other information for materials flowing through a conduit. Such flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith et al. These flowmeters have one or more flow tubes of straight or curved configuration. Each flow tube configuration has a set of natural vibration modes, which may be of a simple bending, torsional or coupled type. Each flow tube is driven to oscillate about a pivot point at resonance in one of these natural modes. Material flows into the flowmeter from a connected conduit on the inlet side of the flowmeter, is directed through the flow tube or tubes, and exits the outlet side of the flowmeter.

The natural vibration modes of the vibrating, material filled system are defined in part by the combined mass of the flow tubes and the material flowing within the flow tubes. When there is no material flow through the flowmeter, all points along the flow tubes oscillate with identical phase due to an applied driver force. As material begins to flow, Coriolis accelerations cause each point along the flow tube to have a different phase. The phase on the inlet side of the flow tube lags the driver, while the phase on the outlet side leads the driver. Sensors are placed on the flow tubes to produce sinusoidal output signals representative of the motion of the flow tubes. The phase difference between two sensor signals is proportional to the mass flow rate of material through the flow tubes.

A complicating factor in this measurement is that the density of typical process materials varies. This causes the frequencies of the natural modes to vary. Since the flowmeter's control system maintains resonance, the oscillation frequency varies in response to changes in density. Mass flow rate in this situation is proportional to the ratio of phase difference and oscillation frequency. The above-mentioned U.S. Pat. No. Re. 31,450 to Smith discloses a Coriolis flowmeter that avoids the need for measuring both phase difference and oscillation frequency. The quotient of phase delay and oscillation frequency is determined by measuring the time delay between level crossings of the two sinusoidal output signals of the flowmeter. When this method is used, the variations in the oscillation frequency cancel, and mass flow rate is proportional to the measured time delay. This measurement method is hereinafter referred to as a time delay or Δt measurement.

Information regarding the characteristics of material flowing in a Coriolis mass flowmeter must be derived with great accuracy since it is often a requirement that the derived flow rate information have an accuracy of at least 0.15% of reading. These flowmeter output signals are sinusoidal and are displaced in time or phase by an amount determined by the Coriolis forces generated by the meter through which the material flows. The signal processing circuitry which receives these sensor output signals measures this time difference with precision and generates the desired characteristics of the flowing process material to the required accuracy of at least 0.15% of reading.

The operation of a vibrating tube Coriolis effect mass flowmeter is based on the Coriolis forces generated when a material conducting member, such as a pipe or tube, is rotated about an axis perpendicular to the tube axis. Coriolis flow tubes are generally not rotated continuously in the same direction because a rotary seal would be required and the seal drag would introduce errors into the Coriolis force measurement. Instead the flow tubes are vibrated so that they rotate about a pivot point a short distance in one direction followed by a corresponding movement in the reverse direction. The Coriolis force is not measured directly, but rather by measuring the resulting deformation of the flow tubes.

A fundamental problem of the vibrating flow tube design is that the material containing member, the flow tube, is also a sensing member that deforms in response to the generated Coriolis force. These dual functions have conflicting criteria. The material containment function requires that the flow tube be stiff and strong enough to withstand the material pressure. The Coriolis force sensing function requires that the flow tube be thin, flexible and deform significantly in response to the Coriolis forces. Meters designed for small diameter pipelines can meet both criteria by making the flow tube wall thick enough to withstand the material pressure and making the flow tubes long enough so as to be flexible despite their thick walls. This design approach does not work on flowmeters suitable for use with large pipelines because the necessary flow tube length would make the flowmeters large and prohibitively expensive.

Another problem with the dual function of the flow tubes is that the material pressure tends to stiffen the tube. A stiffer tube is less sensitive to Coriolis force. Thus, the sensitivity of the meter is lowered by increased material pressures.

It is known to use rotary mass meters to solve the problems of the vibrating Coriolis flow tube meters. The two basic types of rotary mass meters are angular momentum meters and rotary Coriolis meters. They differ in that the angular momentum type changes angular material velocity at constant radial position within the meter flow channel while the rotary Coriolis type changes material radial position within the flow channel at constant angular velocity. Both types solve the above problems of vibrating tube meters by separating the functions of material containment and flow sensing into two separate elements.

Angular momentum flowmeters often consist of two impellers with different blade angles. The impellers are positioned within a pipe with one impeller upstream of the other. The impellers are coupled by a torsional spring which allows an angular displacement between them. This angular displacement represents a phase difference that is proportional to the change in angular momentum of the material and it can be used to determine mass flow rate.

Angular momentum mass flowmeters are shown in the following documents:

U.S. Pat. No. 2,943,487
U.S. Pat. No. 3,232,110
U.S. Pat. No. 3,877,304
U.S. Pat. No. 3,958,447

U.S. Pat. No. 4,012,957
U.S. Pat. No. 4,438,648
British Patent 1069466
European Patent 0485684B1
PCT document WO 94/21990
*A Survey of Mass Flowmeter* by M. P. Wilson, Jr., pp. 63–68, Instrumentation Technology, September 1971

Angular momentum meters suffer from two basic problems. The first is their sensitivity to the velocity profile of the incoming material in the flowmeter pipe. This sensitivity exists because the measured quantity of these meters, torque, is the product of force and radial distance. Material flowing down the center of the pipe, because of the small radius, produces less torque on the impeller sensors than the same flow near the periphery of the pipe. These meters also suffer inaccuracies due to the effects of viscosity of the material. Viscous drag on the impellers and tube wall changes the resultant angular material momentum, the velocity profile, and the torque between the impellers. It is also known to use Coriolis type rotary mass flowmeters in order to solve the velocity profile problem. These meters utilize Coriolis force instead of angular momentum of the flowing material to measure mass flow. These rotary Coriolis meters maintain constant material angular velocity while moving the material radially. These meters also use motor driven rotors having radial holes through which the material flows. At a fixed rotation rate, the torque required for the motor to spin the rotors is ideally proportional to the mass flow rate through the radial holes. The rotor torque is therefore directly proportional to mass flow rate and rpm. Unfortunately, the drag due to seals, bearings, and viscosity add to the rotor torque and introduce measurement errors. The use of a motor also results in a meter that cannot be made intrinsically safe in many applications. Coriolis rotary mass flowmeters are shown in the above Wilson article as well as in the article "Mass Rate Flowmeter Measures Gas, Liquid, or Solids in Product Engineering," p. 211, September 1953.

SOLUTION TO THE PROBLEM

The above mentioned U.S. application Ser. No. 08/404,340 solves the problems of prior rotary Coriolis flowmeters by the provision of a phase measuring rotor system having an outer rotor, an inner (Coriolis) rotor coaxial with the outer rotor and a flexible torsion bar axle connecting the two rotors. The mass flow rate of material through the flowmeter is determined by measuring the rotational displacement between the outer rotor and the coaxial Coriolis rotor. Both rotors fit within a sealed containment housing having a material inlet and a material outlet. The outer rotor has a hollowed out recess into which the Coriolis rotor fits. A cover plate fastened onto a top surface of the outer rotor encloses the Coriolis rotor. Material flowing through aligned holes (flow channels) in the rotors spins the rotors about their rotational axes and imparts a torque to the rotors that is proportional to the mass flow rate of the material. This torque is applied to both the outer and Coriolis rotors. The outer rotor also experiences the viscous, bearing, and seal drag torques plus a drive torque, in some embodiments of the invention. The Coriolis rotor, because it spins at the same rate as the outer rotor which envelopes it, experiences none of these drag torques; it only experiences Coriolis torque. The resultant angular deflection of the Coriolis rotor about its rotational axis with respect to the outer rotor about its axis, is proportional to mass flow rate of the flowing material.

The center of the Coriolis rotor is also hollowed out so that it can house a fluid shear decoupler which is fastened to the rotor cover and rotates at the same rate. The shear decoupler ensures that the Coriolis rotor experiences no forces due to the viscosity or angular momentum of the material in the central inlet/exit port. Clearances exist on all sides of the Coriolis rotor so that it is free to rotate coaxially with respect to the outer rotor except to the extent that it is restrained by its torsion bar axle. Aligned fluid flow channels are formed in the outer rotor, the Coriolis rotor and in the material shear decoupler. In the fluid exit/inlet port on the cover plate, these channels converge and emerge axially as one hole through which material enters or exits the meter.

The dual rotor system of U.S. application Ser. No. 08/404,340 derives mass flow rate information by measuring the amount by which the Coriolis rotor is angularly offset from the outer rotor about a common axis coaxial to the two rotors. A first possible embodiment disclosed therein, receives material via an inlet tangential to an inner surface of the flowmeter housing and directs the material through aligned radial channels in both the outer rotor and Coriolis rotor. The channels in the Coriolis rotor extend the material to mating aligned channels in the fluid shear decoupler which rotates with the outer rotor and which transforms the material from radial flow as received from the channels of the Coriolis rotor to an axial flow that is applied to the material outlet of the flowmeter. The fluid shear decoupler isolates the Coriolis rotor from forces to which it would be subjected if the material was applied directly by the channels of the Coriolis rotor to the meter outlet for axial delivery to the pipeline to which the flowmeter is connected.

Another embodiment disclosed in U.S. application Ser. No. 08/404,340 comprises an inline flowmeter having coaxial dual concentric rotors and material inlets and outlets. The axis of rotation of each rotor is coaxial with the material inlet, the outlet and a flow diverter for receiving the axial material flow from the inlet. The received material flow is applied tangentially to the periphery of the outer rotor and the holes therein.

In all embodiments of U.S. application Ser. No. 08/404,340, sensing coils and magnets provide output information indicating the rotational displacement of the Coriolis rotor with respect to the outer rotor. A first set of magnets is embedded in the Coriolis rotor while a second set of magnets is embedded in the outer rotor. A first sensing coil senses the motion of the first set of magnets while a second sensing coil senses the motion of the second set of magnets. Each coil produces a periodic wave output with the phase difference between the two output waves being proportional to the angular displacement of the Coriolis rotor with respect to the outer rotor and, in turn, proportional to the mass flow rate of the material flow within the flowmeter.

This continuation in part application discloses alternative embodiments of a dual rotor Coriolis mass flow measuring apparatus. The alternative embodiments shown herein are advantageous for use in certain applications. They are cheaper to build and they are less susceptible to damage from abrasive or aggressive materials. As already mentioned, the dual rotor system of the above-identified co-pending application derives mass flow information by measuring the amount by which an inner rotor, termed a Coriolis rotor, is angularly offset from an outer rotor about a common rotational center axis in response to material flow through substantially aligned holes or channels in the Coriolis and outer rotor. In use, the two rotors are angularly offset with respect to each other about their common rotational axis due to the different torques exerted on each rotor. At equilibrium, the outer rotor experiences drag (negative) torques due to seals, bearings, material viscosity, and material acceleration plus a lesser positive Coriolis torque. The Coriolis rotor experiences only a Coriolis torque that is equal and opposite to the sum of the torques on the outer rotor plus the torque on the shear decoupler. These opposite torques cause the Coriolis rotor to be angularly offset with respect to the outer rotor by an amount that is proportional to the mass flow rate.

The alternative embodiments shown in the present application operate on the same principles as that shown in the aforementioned co-pending U.S. application. However, the structure of the embodiments disclosed herein differs from the apparatus shown in the co-pending parent application. The apparatus embodying the present invention comprises a rotating rotor assembly having a rotor plate, a shear decoupler, radial flow channels, and a rotor cover all serving the same functions and of essentially the same form as in the previous invention. The present application differs in that the Coriolis rotor and associated torsion bar are replaced by flexible fins which are adjacent to and define the flow channels in the area formerly occupied by the Coriolis rotor. These fins bend in response to the Coriolis force of the material. By affixing magnets or other sensing elements to the free ends of these fins and another set of magnets or other sensing elements to the outer rotor, a time delay and thus a mass flow rate can be ascertained. The flow channels in the region defined by the flexible fins are of rectangular cross section. The top and bottom of each channel is defined by the rotor cover and the rotor plate. The channel sides are defined by the flexible fins. The Coriolis force on the fins is independent of the channel area, therefore the flexible fin channel sides can be either parallel to each other or radially oriented. In the preferred radial orientation, the flow channels and the vanes between the flow channels are wedge shaped.

Each wedge shaped flow channel permits material to flow from the center of the rotor assembly and radially outward through each wedge shaped flow channel to the periphery of the rotor assembly and, in turn to an outlet of the housing in which the rotor is encased. The flowmeter and its rotor assembly may also be operated in a reverse material flow direction wherein the material flows into the wedge shape flow channel at the periphery of the rotor assembly and axially inward through the wedge shape flow channel to the center part of the assembly and from there out of the flowmeter through an opening coaxial with the center portion of the rotor assembly.

The rotor assembly comprises a plurality of wedge shaped vanes with each vane having both fixed elements and flexible elements which can move with respect to each other due to the Coriolis induced force. Each wedge shaped vane is separated from the adjacent rotor vanes by voids comprising the wedge shaped flow channels.

Each wedge shaped rotor vane includes fixed inner and outer segments separated by a movable center flexure portion. A lower or fixed edge of each flexure is affixed to the circular base plate of the rotor assembly. The flexure walls deflect like cantilever beams in response to the Coriolis generated forces. A magnet affixed to the upper or free edge of each flexure element moves with the flexing of the wall to which it is affixed. The magnet positions are detected by an associated stationary coil to produce a periodic output signal whose phase is compared to a similar periodic output signal generated by magnets affixed to the non flexible portions of the wedge shaped vanes. The phase or time difference between the output signals of the two coils permits the mass flow rate of the material through the flowmeter to be derived.

In a first exemplary embodiment of the invention, each wedge shaped vane comprises a non-flexible outer portion having one end flush with the outer periphery of the circular rotor plate and which serves the same function as an outer rotor. Each rotor vane also includes a non-flexible inner portion having an inner arcuate surface which defines a segment of the previously mentioned center portion of the rotor assembly and which serves the function of a shear decoupler. The outer portion of a vane is separated from the inner portion of the vane by a flexure element that flexes in response to the Coriolis forces generated by material flow.

The flexure element positioned between the inner and outer members of each wedge shaped vane comprises a U shape member having walls separated from each other by a distance equal to the width of the wedge shaped vane of which the flexure element is a part. The walls of the U shaped flexure are not affixed to any other element and therefore are free to flex in response to the generated Coriolis forces. In so doing, the two walls of the U shaped member flex as cantilever beams about a pivot point at the base of the U-shaped flexure where it abuts the lower flat surface of the U-shaped flexure. One wall of a U shaped flexure comprises part of the wall of one wedge shaped flow channel while the opposite wall of the same U shaped flexure comprises a portion of the wall of the adjacent wedge shaped flow channel.

A magnet is affixed to the upper portion of one or both walls of each U shaped flexure. The magnet is displaced by Coriolis forces by the same amount as is the wall to which it is affixed. This displacement is detected by an associated coil with the output signal from the coil being compared to an output signal from a magnet/coil combination associated with a non-flexible portion of the rotor assembly in order to generate information indicating the phase displacement between the two signals and, in turn, the mass flow rate of the material flowing through the flow channel.

In accordance with a second embodiment of the invention, the rotor assembly comprises a flat circular rotor plate and a plurality of wedge shaped flow channels separated from each other by V shaped fin elements each having a lower edge affixed to a surface of the rotor plate and having a second edge that is free to move. The ends of each leg of the V-shaped fin are flush with the outer periphery of the circular rotor plate. The apex of the V shaped fin terminates in a center portion of the rotor assembly. In this manner, the circular rotor plate with the V-shaped fins affixed to its face defines a plurality of wedge shape like flow channels with adjacent wedge shaped flow channels being separated by the walls of a single V-shaped fin.

Each leg of a V shaped fin has a pair of slits as to define an inner, middle and outer portion of each leg of the fin. The function of the slits is to separate the inner and outer portions, which experience non-Coriolis forces, from the middle portion which experiences only Coriolis forces. A magnet is affixed to the free edge of one of the middle segments of each V shaped element. The middle section of each V shaped element thus comprises a flexure that deflects in response to the Coriolis forces generated by material flow through the channels. The attached magnet deflects by an amount corresponding to the flexure of the element to which it is affixed. A coil associated with the magnets generates a periodic output signal whose phase is compared to the phase of a magnets/coil combination affixed to the nonflexible portion of the rotor. The phase difference between these two output signals is utilized to determine the implied Coriolis force and in turn to derive the mass flow rate of the material in the flow channels.

The flow channels and sensing mechanism formed by the wedge shaped vanes and flexures of the first described embodiment and the V shaped elements of the second embodiment comprise a rotor assembly system that has a design free of bushings, bearings and the torsion bar. It is a design which is easy to manufacture and which is less susceptible to gritty or aggressive materials. At the same time, the design provides and generates output signals indicative of the mass flow rate of the material.

In accordance with yet another embodiment of the invention, the rotor assembly is rotated by a motor to perform the dual functions of a fluid pump and a mass flow measurement device for providing mass flow information for the fluid delivered by the pump.

DETAILED DESCRIPTION

Figure 1:
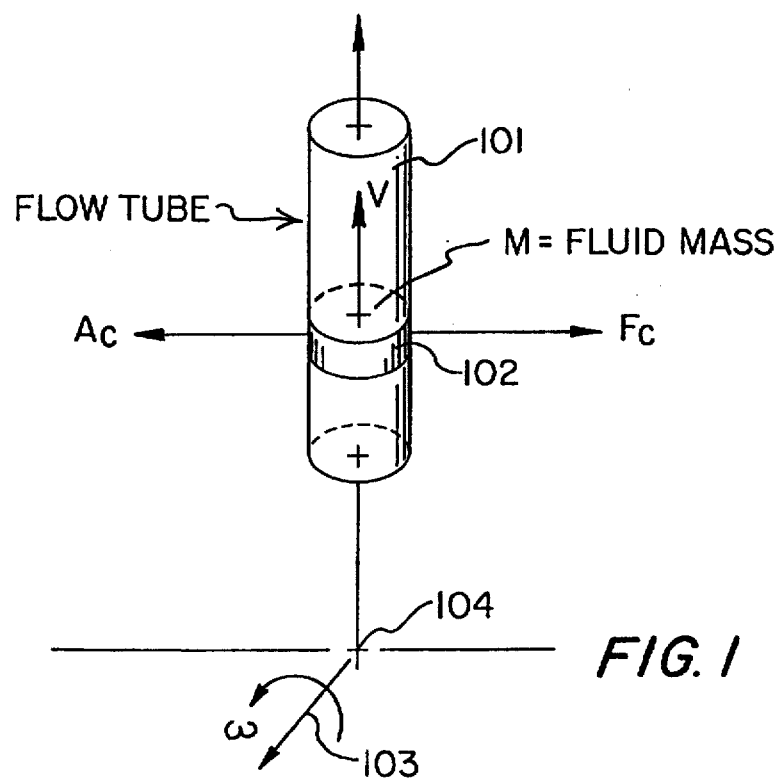
FIGS. 1 and 2 illustrate physical forces associated with the operation of a Coriolis flowmeter.
Figure 2:
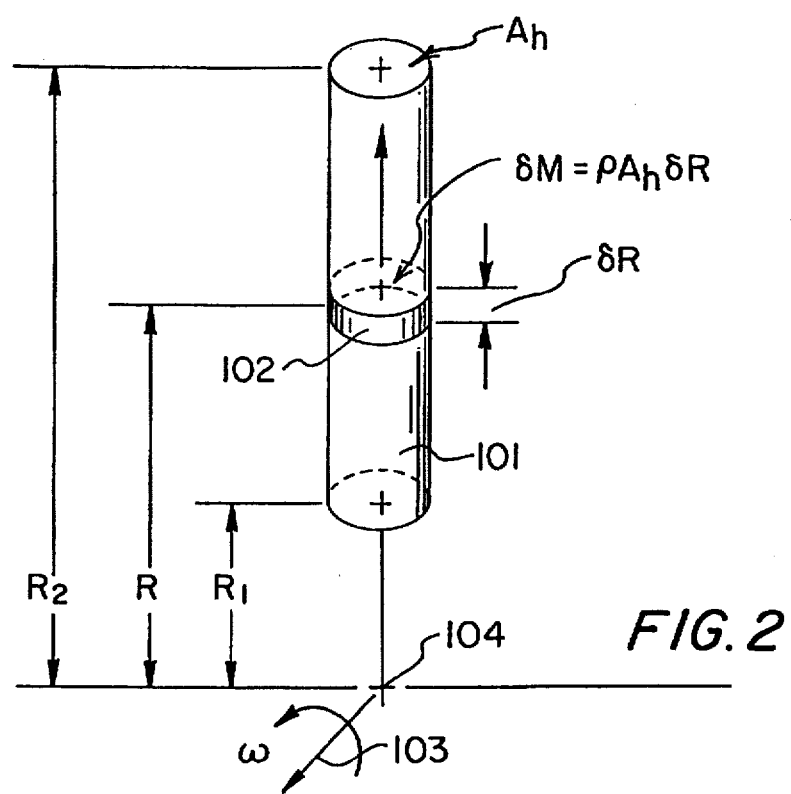

FIGS. 1 and 2 disclose a flow tube 101 having a slug of fluid mass 102 flowing at a velocity V. In vibrating Coriolis flowmeters, the rotation of flow tube 101 about pivot point 104 is not continuous but, rather, comprises an oscillatory motion wherein flow tube 101 rotates about pivot point 104 briefly in one direction followed by a return rotation in the opposite direction. The reason for this is that it is not feasible with conventional flowmeters to rotate the flow tubes continuously due to mechanical problems such as the provision of the required seals and the resulting drag imposed by the seals. This limitation is overcome by the apparatus of the present invention.

Flow tube 101 rotates counterclockwise at an angular velocity ω about pivot point 104 as defined by vector 103. Under this condition, the slug of fluid mass 102 is subject to a Coriolis acceleration $A_c$ as it moves away from pivot point 104 at a velocity V. It is the walls of flow tube 101 and force $F_c$ on the wall that enable the slug of fluid mass 102 to undergo the Coriolis acceleration.

The generated Coriolis force $F_c$ may be expressed as follows:

$$F_c = MA_c \quad \text{Eq. 1}$$

where $F_C$=Coriolis force on the tube
M=fluid mass
$A_c$=Coriolis Acceleration.

From the laws of physics, the Coriolis Acceleration $A_c$ may be expressed as:

$$A_c = 2(\omega \times V) \quad \text{Eq. 2}$$

ω=flow tube angular velocity
V=fluid velocity

Substituting equation 2 into equation 1, the Coriolis force on the flow tube wall may be expressed as:

$$F_c = M \times 2(\omega \times V) \quad \text{Eq. 3}$$

The Coriolis acceleration $A_c$ is the rate of change of tangential velocity to which the slug of fluid mass 102 is subjected as it travels at a velocity V through the flow tube 101 away from the pivot point 104. Equation 2 may be intuitively understood by appreciating that the slug of fluid travels a finite distance during an interval of time δt and that during this time interval, the distance of the slug of fluid 102 from the pivot point 104 increases. If the slug of fluid 102 was originally at a distance R from the pivot point 104 then, after a time interval δt, the slug of fluid will be at a distance R+δR from pivot point 104. The tangential velocity of any point on the flow tube is a function of the angular velocity ω at which the flow tube is rotating times its distance from pivot point 104. At the end of interval δt, the slug of fluid 102 is further from the pivot point 104 by the amount δR. This being the case, the slug of fluid 102 is traveling at a greater tangential velocity after the time interval δt when its distance is R+δR from the pivot point, than it was at the beginning of the time interval when its distance from the pivot point was R. This increase in the tangential velocity divided by the time-interval δt equals the Coriolis acceleration $A_c$ of the slug of fluid mass 102. The radial velocity V of the fluid mass of slug 102 remains constant during this time interval even though the slug of fluid mass 102 increases its tangential velocity as it travels further and further from pivot point 104.

From Equation 3 it can be seen that the Coriolis force $F_c$ shown in FIG. 1 is proportional to the mass M of the fluid in flow tube 101, and to the angular velocity ω at which the flow tube 101 rotates about a pivot point 104 as well as proportional to the velocity V at which the fluid mass travels through the flow tube.

FIG. 2 and the following discussion describe the forces applied to and associated with a spinning rotor as material flows through radial holes (or tubes) in the rotor. Note that while the radial holes am shown as circular in cross section, they may be rectangular or of any other sectional shape. For non-circular sections, flow channel may be the preferred term rather than flow tube. On FIG. 2, $A_h$ is the cross sectional area of the interior portion of flow tube 101 of FIG. 1. The slug of fluid mass 102 has a thickness δR and a cross sectional area $A_h$. The mass of this slug 102 may be expressed as $\rho A_h \delta R$ where δ equals the density of the material comprising slug 102, where $A_h$ is the cross sectional area of the slug 102 and where δR is the thickness of slug 102.

$$\delta M = \rho A_h \delta R \quad \text{Eq. 4}$$

This expression for the differential mass can be used in the differential version of equation 3.

$$\delta F_c = 2\delta M(\omega \times V) \quad \text{Eq. 5}$$

$$\delta F_c = 2\rho A_h \delta R(\omega \times V) \quad \text{Eq. 6}$$

this equation can be simplified by substituting:

$$\dot{M} = \rho A_h V \quad \text{Eq. 7}$$

to yield:

$$\delta F_c = 2\dot{M}\omega \delta R \quad \text{Eq. 8}$$

The lower portion of flow tube 101 is at a distance R1 from the axis 103 containing pivot point 104. Slug 102 is at a distance R from the pivot point 104 while the top extremity of the flow tube 101 is at a distance R2 from the pivot point 104. If the tube is full of moving fluid, integrating equation 8 from $R_1$ to $R_2$ gives the total force on that section of tube due to the Coriolis acceleration of the fluid in it.

$$F_c = 2 \int_{R_1}^{R_2} M\omega \delta R \qquad \text{Eq. 9}$$

$$F_c = 2\dot{M}\omega(R_2 - R_1) \qquad \text{Eq. 10}$$

The Coriolis force on the section of tube was used in the prior patent application to calculate the torque applied to the Coriolis rotor. The present invention does not have a Coriolis rotor or torsion bar with which to react to torque, but the same force acts to deflect the flexible fins.

DESCRIPTION OF FIGS. 7 AND 8

Figure 7:
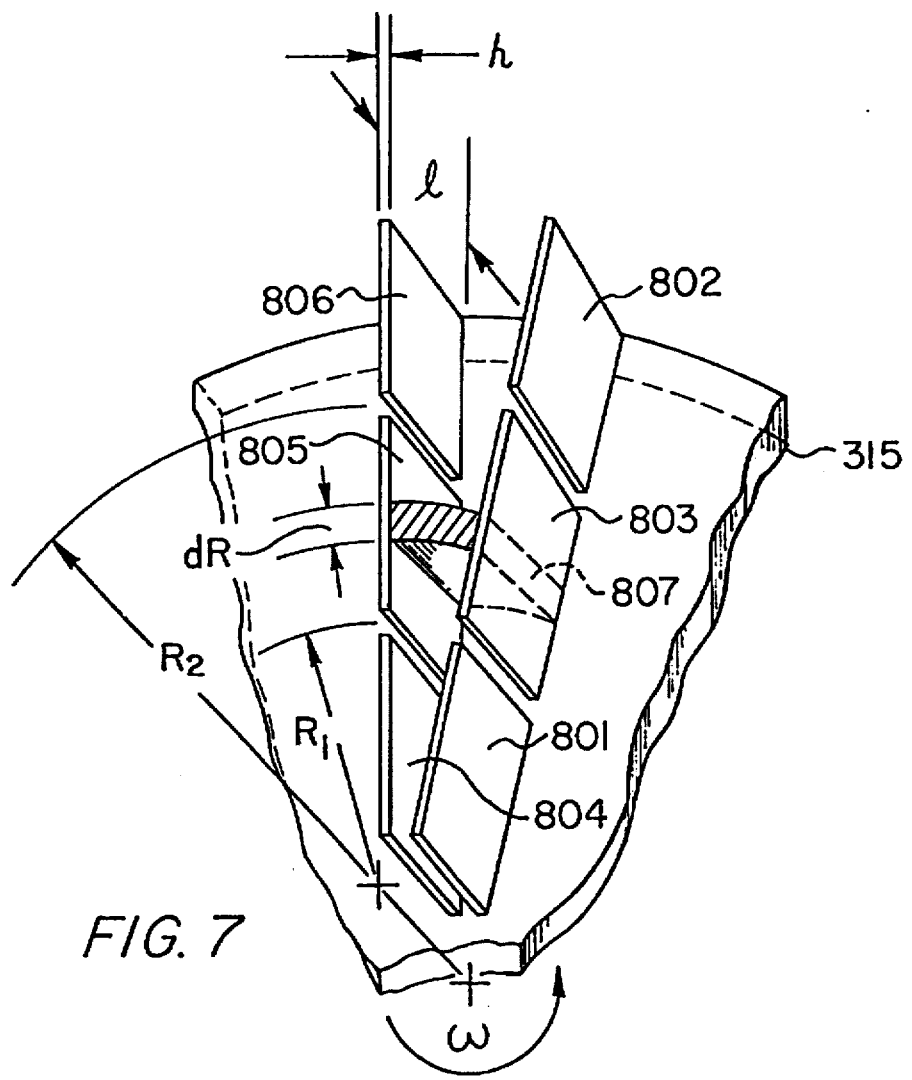
FIGS. 7 and 8 illustrate physical forces associated with the apparatus of the present invention.
Figure 8:
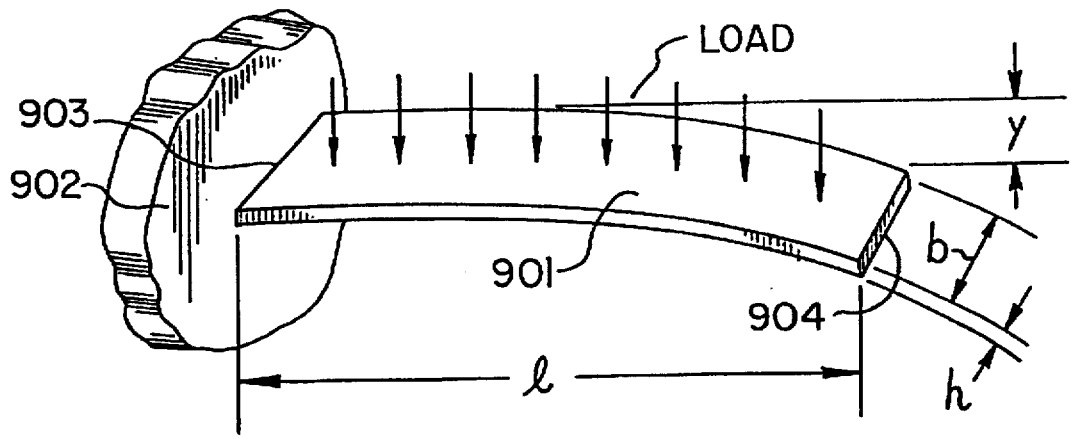

FIGS. 7 and 8 illustrate the physical principals underlying the operation of the apparatus of the present invention. The sensing elements of the present invention consists of a number of flexible fins 804 affixed to a rotor assembly 315. The fins are oriented such that the faces of the fins lie in planes which include the axis of rotation of the rotor assembly. One edge 903 of each fin is affixed to a surface 902 of the rotor assembly. The fins 804, the rotor plate 315, and the rotor cover define radial flow channels in the rotor assembly. The material flowing through these rotating flow channels is forced to undergo Coriolis acceleration by the walls of the fins. The accelerating force (equation 10) is applied to the fin as a uniform pressure. The material in the leading side of the channel (with the material flowing radially inward) will have a higher pressure than the material in the lagging side of the channel. (FIG. 8) The fin deflects in response to a higher pressure on one side of it than the other. The amount of deflection can be calculated by treating the flexible fin 901 as a uniformly loaded cantilever beam. See FIG. 8.

The equation for the deflection of a uniformly loaded cantilever beam is:

$$y = F \frac{L^3}{8EI} \qquad \text{Eq. 11}$$

where: y=beam end deflection F=total load L=beam length E=Young's modules I=moment of inertia The moment of inertia for a beam of rectangular cross section is given by the equation:

$$I = \frac{bh^3}{12} \qquad \text{Eq. 12}$$

b = beam width
h = beam thickness

Substituting equation 12 into equation 11:

$$y = 1.5 \frac{FL^3}{Ebh^3} \qquad \text{Eq. 13}$$

If the cantilever beam is the flexible fin of the present invention, then the load, F, becomes the Coriolis force, $F_c$, as derived in equation 10. The beam width, b, becomes the fin width, $R_2-R_1$. The beam length, L, becomes the axial dimension of the fin, and the beam thickness, h, becomes the fin thickness. Making these substitutions into equation 13 yields:

$$y = \frac{1.5(2\dot{M}\omega)(R_2 - R_1)L^3}{E(R_2 - R_1)h^3} = \frac{3\dot{M}\omega L^3}{Eh^3} \qquad \text{Eq. 14}$$

Equation 14 shows that the deflection of the end of the end of the flexible fin (and the associated magnet) is directly proportional to mass flow rate. The magnet movement results in an angular shift (angle vertex on the rotation axis) between the magnets affixed to the flexible fins and those affixed to the rotor assembly. The value of the angular shift can be shown geometrically to be equal to the inverse tangent of the magnet deflection divided by the radius to the magnets ($\phi=\tan^{-1}y/R$). If the deflection, y, is small compared to R then the small angle approximation, $\tan\Theta=\Theta$, can be used for the angular deflection and thus $\phi=y/R$. It follows, since y is proportional to mass flow rate, that $\phi$ is also proportional to mass flow rate. The flexible fin geometry will therefore behave like the torsional spring design of the previous invention.

EMBODIMENT OF FIG. 3

Figure 3:
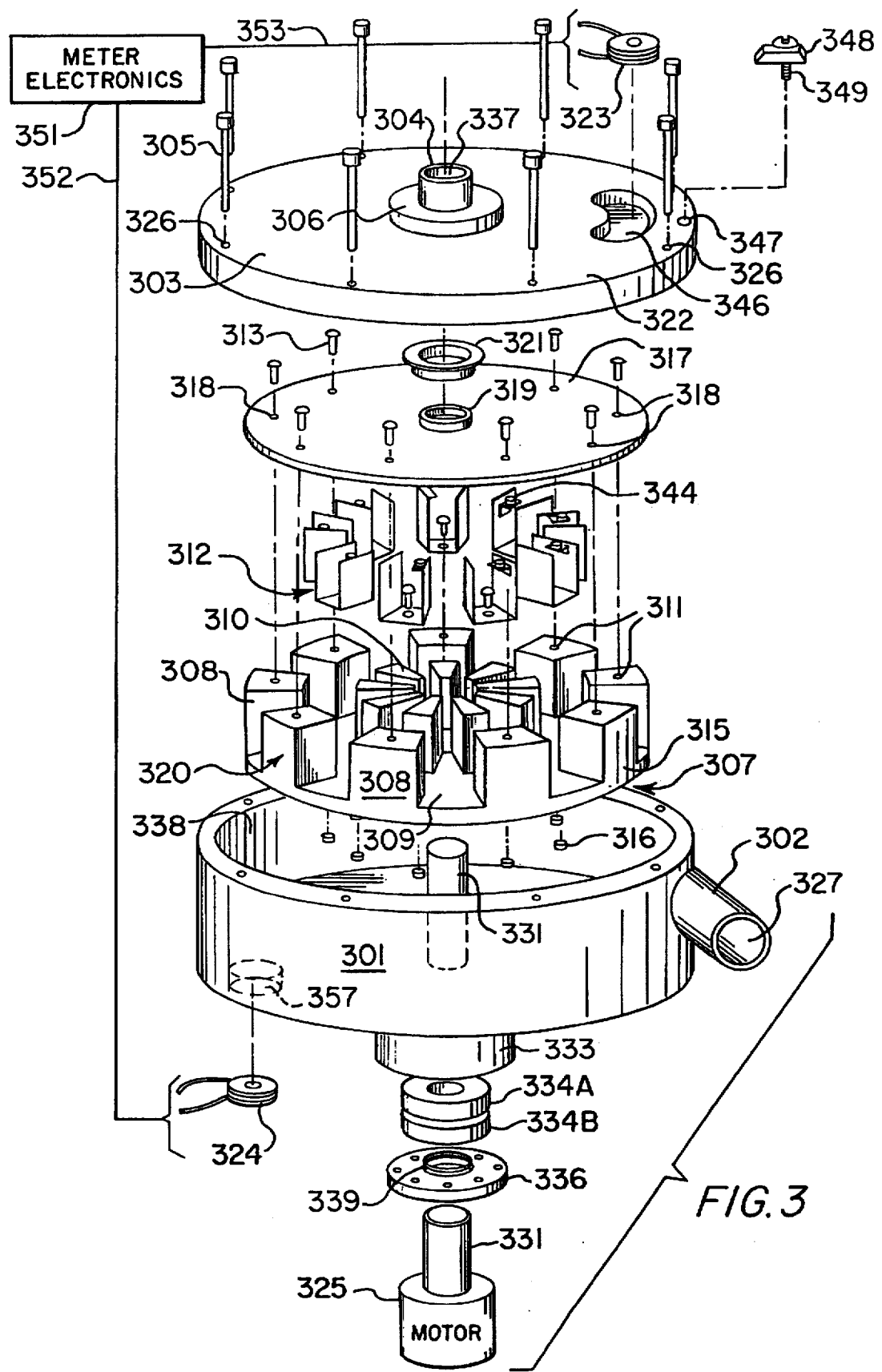
FIG. 3 is an exploded view of one possible exemplary embodiment of the invention.

FIG. 3 discloses an exploded view of one possible preferred exemplary embodiment of the invention. This embodiment comprises a cylindrical shaped material containment housing 301, a rotor assembly 307, rotor assembly cover 317 and a material containment housing cover 303. Inlet 302 having opening 327 comprises a portion of material containment housing 301. Outlet 304 having opening 337 is affixed to housing cover 303 by flange 306. In use, rotor assembly 337 is positioned within recess 338 of material containment housing 301. Axle 331 is affixed on its top to the bottom of rotor assembly 307 and on its lower end rotably extends through bearing 334A, bearing 334B, bearing cup 333 having circlip 339 and bearing cup cover 336. Rotor assembly 307 rotates freely with axle 331 when it is positioned within material containment recess 338 of housing 301.

Figure 4:
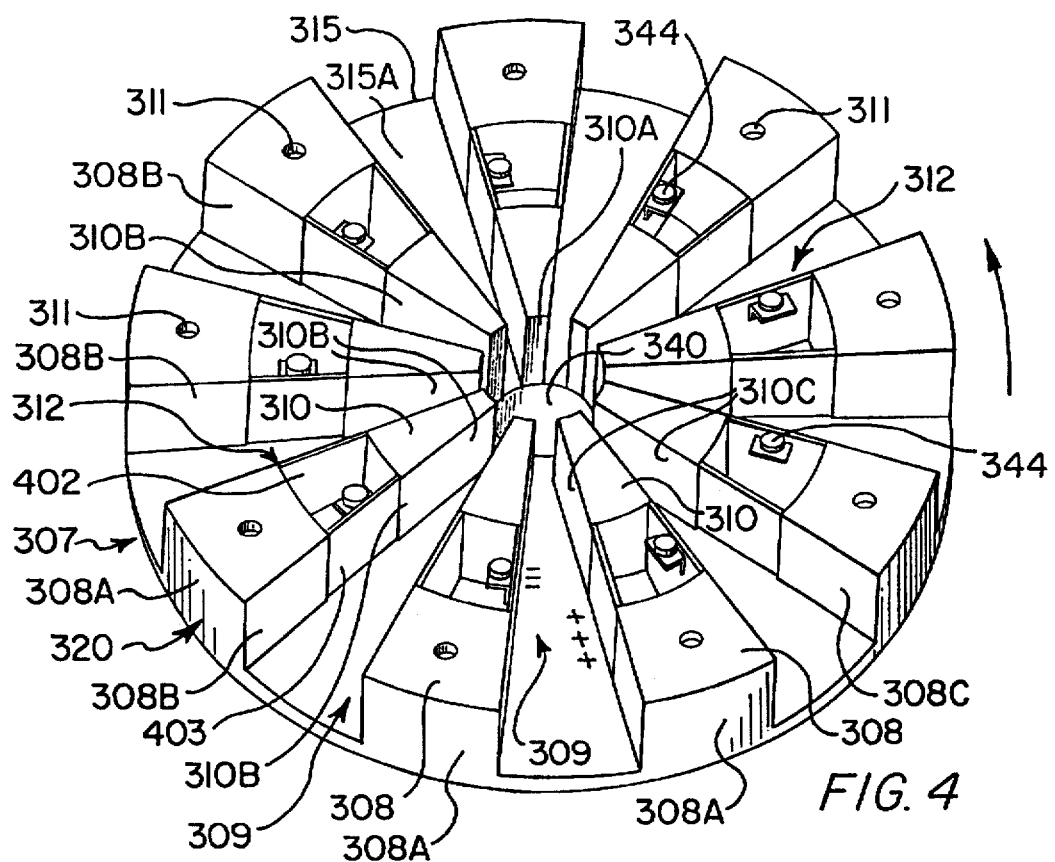
FIG. 4 is a detailed view of the rotor assembly of FIG. 3.

The rotor assembly 307 is shown in greater detail on FIG. 4 and comprises a circular rotor base plate 315 having a top surface 315A to which is affixed a plurality of wedge shaped vanes 320. A plurality of wedge shape like flow channels 309 am defined by the sparing between the wedge shape vanes 320. Each vane 320 comprises an outer vane element 308, and inner vane element 310 and a U-shaped flexure 312 positioned between vane elements 308 and 310. Outer vane elements 308 am arranged so as to form a circular pattern around the outer portion of rotor plate 315. The outer wall 308A of each outer vane element 308 is flush with the periphery of rotor surface plate 315. The inner vane 310 of each wedge shape vane 320 has inner surface 310A flush with the center area 340 of rotor base plate 315. Flexure 312 has a lower portion (not shown on FIG. 4), affixed to the top surface 315A of rotor plate 315.

Figure 6:
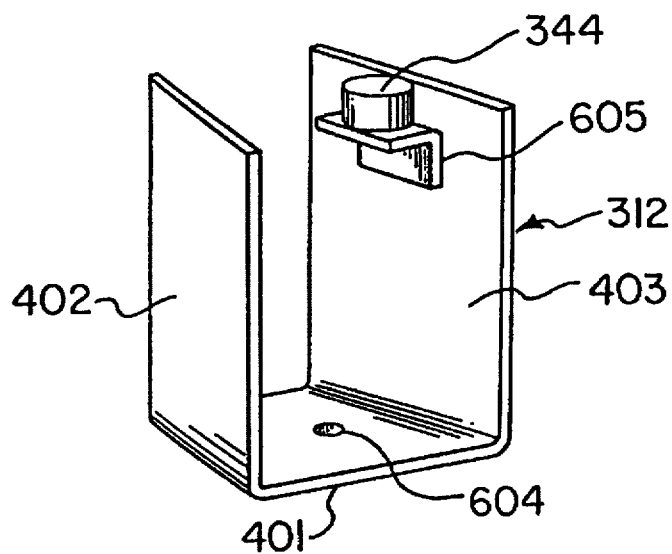
FIG. 6 illustrates the details of an alternative rotor assembly.

FIG. 6 shows the flexure 312 as having a side wall 402, a second side wall 403 and a lower portion 401 having an opening 604 that is adapted to receive a screw for attaching the bottom surface of 401 to the top surface 315A of rotor plate 315. A magnet 344 (FIGS. 3, 4 and 6) is affixed to a side wall 403 of flexure 312 by means of bracket 605.

The top surface of rotor cover 317 (FIG. 3) includes boss 319 which receives seal 321 which cooperates with a bottom portion of material outlet 304 affixed to the housing cover 303. Seal 321 prevents the leakage around the rotor assembly and ensures that the material flows within the flow channels 309 and exerts a Coriolis force on flexible side walls 402 and 403. Screws 313 extend through openings 318 in rotor cover 317 to attach the rotor cover 317 to the top surfaces of rotor vanes 320 by means of holes or openings 311 in the top surfaces of outer vanes 308.

The top surface of housing cover 303 includes opening 346 which receives coil 323 which is used as subsequently described to determine the angular displacement between the various portions of each wedge shaped vane 320.

In use, rotor assembly 307 and wedged shaped vanes 320 are positioned within recess 338 of containment housing 301. Housing cover 303 (FIG. 3) is affixed by means of screws 305 and holes 326 to the top surface of material containment housing 301. The assembled flowmeter is connected to a pipeline (not shown) with the supply portion of the pipeline being connected to material inlet 302 and with the downstream portion of the pipeline being connected to material exit 304. The passage of material through opening 327 of inlet 302 into housing 301 causes the rotor assembly 307 to rotate counterclockwise as material travels through the flow channels 309 radially inward toward the center portion 340 of the rotor assembly 307 and then travels upwards on FIG. 3 to exit the flowmeter at opening 337 of material outlet 304.

In flowing through the rotating channels, material Coriolis acceleration causes the walls 402 and 403 of flexure 312, (FIG. 6), to move laterally so that their upper ends become offset with respect to the vertical walls 308B and 310B of outer vane element 308 and inner vane element 310. Walls 402 and 403 bend in a cantilever beam fashion about their lower terminus where they join the bottom portion 401 of the U shaped flexure element 312 (FIG. 6). Each magnet 344 affixed to each wall 403 is displaced laterally by the generated Coriolis forces. The fields of magnets 344 are detected by coil 323 as rotor assembly 307 rotates. Coil 323 is positioned within opening 346 of housing cover plate 303. Coil 324 (FIG. 3) is affixed to an opening 357 in the bottom portion 357 of housing 301 and cooperates with magnets 316 positioned within the lower surface of rotor plate 315. Coils 323 and 324 generate output signals on paths 353 and 352 as magnets 344 and 316 and rotor assembly 307 rotate. The signals on paths 353 and 352 differ in phase with flow and the application of these phase shifted signals to meter electronics 351 permits it to determine the mass flow rate and other information pertaining to the flowing material.

Coil 323 is positioned within opening 346 of cover 303 on the top of FIG. 3. This permits the position of coil 323 to be adjusted so that the periodic wave outputs of coils 323 and 324 are coincident with each other during the no flow condition of the meter. This is necessary for calibration of the meter. The position of coil 323 within opening 346 is fixed by means of retainment element 348 and screw 349 which are screwed into opening 347 with the bottom of retainer 348 being clamped to the top surface of coil 323 to prevent its further movement. When zeroed, the output signals of the 323 and 324 coils are coincident with each other for a no flow condition of the flowmeter but are offset or phase displaced with respect to each other for material flow conditions. This phase offset is proportional to the mass flow rate of the material flowing in the flowmeter and is used by meter electronics 351 to determine the mass flow rate of the material. Meter electronics element 351 is well known in the art and if desired may comprise Micro Motion Part Number RFT9739.

Motor 325 is affixed to the bottom of axle 331 and used to rotate the rotor assembly 307 for calibration purposes during a zero flow condition of the flowmeter. This can be done during the manufacturing process if desired. In an alternative motor driven embodiment, the motor can be used to spin the rotor assembly to cause the material to be pumped through the meter from the central port 304, through the rotor assembly 307, and out the tangential port 302. The torque imparted by motor 325 to axle 331 and in turn to rotor assembly 337 permits the rotor assembly to perform the dual function of a pump as well as a Coriolis Mass Flowmeter that indicates the mass flow rate of the material flowing through the pump. In the motor driven pump alternative, motor 325 is permanently affixed to axle 331. In the flowmeter/non-pump alternative of the invention, the motor 325 may, if desired, be permenately affixed to axle 331. Alternatively, the motor may be normally disconnected from axle 331 in order to provide an intrinsically safe flowmeter. In such cases, the motor may be temporarily connected to axle 381 for calibration purposes so as to achieve a zero phase difference between the output signals of coils 323 and 324 during a zero flow condition of the flowmeter. After calibration the motor may then be disconnected.

Let it be assumed that the rotor assembly 307 is rotating counterclockwise as shown on FIG. 4 and that material flows from inlet opening 327 on FIG. 3 through flow channels 309 to the center portion 340 of the rotor assembly 307 and then upwardly from center portion 340 and out of opening 337 of outlet 304. Under these conditions, the material flow through channels 309 causes the walls 403 and 402 (FIGS. 4 and 6) of each U shaped flexure 312 to be displaced in a counterclockwise direction with respect to the non-moveable walls 308A, 308B, 310A, and 310B of their associated vane elements 308 and 310. With respect to the flow channel 309 shown on the bottom of FIG. 4, the material flow generates a positive material pressure on the right side of the flow channel adjacent the flexure wall 402 at the 5 o'clock position and generates a relative negative material pressure on the corresponding flexure wall 403 of the U shaped flexure whose wall 403 is positioned at approximately the 6 o'clock position on FIG. 4. Positive and negative pressures are generated in the corresponding areas of the other flow channels 309 shown on FIG. 4. This forces the upper portion of the flexure walls to deflect to the right or counterclockwise insofar as concerns the walls of the U shaped flexure 312 in the 5 o'clock and 6 o'clock positions so that magnets 344 affixed to walls 403 of these U shaped flexure are also deflected to the right. This deflection of magnets 344 is detected by pick up coil 323 and causes a phase displacement between the output signals of coil 323 and coil 324. Magnets can be placed on any number of flexure walls so long as an equal number is placed on a non-flexible portion of the rotor. The number of magnets along with the rotational speed of the rotor will determine the frequency of the output signals.

The spacing between the ends of walls 402 and 403 of each U shaped element 312 and the walls of its associated outer and inner vanes 308 and 310 is sufficiently close so that a significant flow of material does not pass through into the U shaped void or space formed by the distance between the two walls 402 and 403 of U shaped element 312.

DESCRIPTION OF FIG. 5

Figure 5:
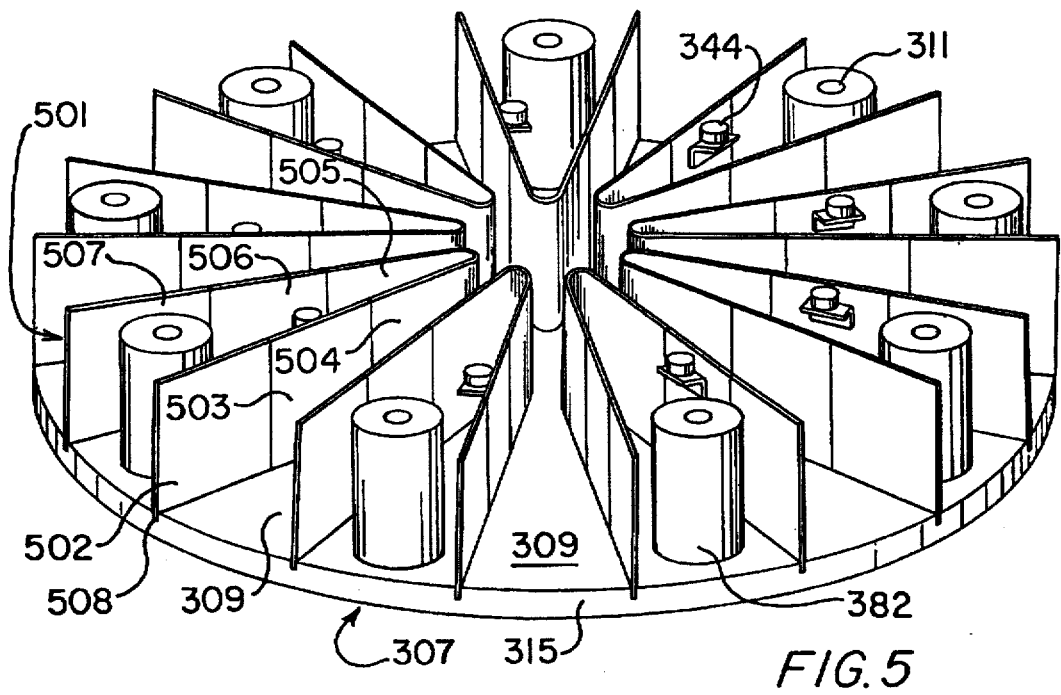
FIG. 5 illustrates further details of the flexure element of FIG. 4.

FIG. 5 discloses an alternative embodiment in which the wedge shaped vanes 320 of the rotor assembly 307 of FIG. 4 are replaced by V shaped fins 501 having a plurality of segmented sections formed by vertical slits in the walls of each fin 501. Each such V shaped rotor fin 501 is separated from an adjacent V shaped element 501 by the space formed by a flow channel 309. Each V shaped fin 501 has a plurality of segments numbered 502, 503, 504 on one leg segment and 505, 506, 507 on another leg of the V shaped element.

Elements 502 and 507, on the outer portion the V shaped fin 501, correspond to an outer vane element 308 on FIGS. 3 and 4. The middle segments 503 and 506 of each V shaped fin 501, are the functional equivalent of the flexure element 312 of FIGS. 3 and 4. Segments 504 and 505 on the inner portion of each leg of the V shaped fin 501 corresponding to the inner vane elements 310 of a wedge shaped vane of 320 on FIGS. 3 and 4. A magnet 344 is affixed to an upper portion of fin segment 503 to permit its flexing to be detected by coil 323 as Coriolis forces generated by the flow of material through wedge shaped flow channels 309 during the operation of the flow meter. The bottom portion of the V shaped fins 501 are fixably inserted into groves 508 of rotor plate 315.

The flow of material through flow channels 309 as rotor 315 rotates generates Coriolis forces which cause the segments comprising the legs of each V shaped fin 501 to flex. The flexing of the center fin elements, such as elements 503 and 506, is detected by magnet 344 affixed to segment 503 of each V shaped fin. The amount of displacement of the magnets 344 is proportional to the generated Coriolis forces caused by the material flow through flow channels 309. The movement of each magnet 344 is detected by the signals induced in coil 323 as magnets 344 pass beneath coil 323 as the rotor assembly 307 rotates. The flexure of the walls to which each magnet 344 is affixed causes the signal induced in coil 323 to be offset with respect to the signal induced in coil 324. This phase displacement between the signals generated by coils 323 and 324 is applied to meter electronics 351 over paths 352 and 353 and used as priorly described to generate mass flow and other information for the material flowing through the flow channels 309.

The slits shown on FIG. 5 that separate the various fin segments, such as segments 502 and 503 from each other, may extend from the top to the bottom of each fin element if desired. These slits serve the function isolating the Coriolis sensing fin from the non-Coriolis forces to which the inner and outer segments are subject. It is expected that the inner and outer fin in the vicinity of the slits will deflect nearly the same amount as the Coriolis fin and the amount of leakage through the slits will be negligible. The hole 311 in the top of each post 382 permits rotor plate 317 of FIG. 3 to be affixed to rotor plate 315 of FIG. 5 by means of screws 313 and holes 318 in the rotor plate 317.

The flexible fins in the embodiments thus far described have their bending axes perpendicular to the rotational axis of the rotor. This configuration is necessary if the meter calibration factor is to be independent of material density. The reason, as mathematically derived in the prior patent application, is that any curvature of the flow channels in the plane of the rotor results in a material velocity dependent force on the fins which introduces an error into the flow measurement.

On FIGS. 3 and 4, the inner vane elements 310 perform a material shear decoupler function that isolates the flexure elements 312 from the forces to which they would be subjected if the inner vane elements 310 were not present. The material flowing through flow channels 309 inwardly from the outer periphery of the flow channel to the center portion of the rotor assembly 307 has a momentum caused by the rotation of the flow channel through which the material flows. As the material nears the center portion of the rotor assembly 307, it encounters the material exit/inlet 304. The wall of the exit port 304 and the exit pipe (not shown) do not rotate and thus they slow the rotation of the exiting fluid. If the fluid is sufficiently viscous, it can transmit a torsional drag back to the center portion of the rotor assembly 307. The inner vane elements 310 absorb the forces associated with this drag. In so doing, the inner elements 310 of each vane isolate the flexure elements 312 from the forces associated with this torsional drag and permit the flexure elements 312 and its walls to be subjected at all times only to the Coriolis forces. This enhances the accuracy of the flow meter by insuring that the magnitude of the flexure of the magnets 344 affixed to the flexure walls represents only the magnitude of the generated Coriolis forces and conversely, does not represent displacements that would otherwise be caused by viscous drag and other forces to which inner vane elements 310 are subject.

The outer vane elements 308 are somewhat similar to inner vane elements 310 since they also perform a decoupling function. They isolate the flexure elements 312 from viscous drag at the periphery of the rotor assembly as well as from the acceleration forces that result when the fluid has to abruptly change velocity upon entering the rotor channels 309. Outer vane elements 308 provide the forces necessary to effect this material flow transformation so that the walls of flexure elements 312 are subject to only the generated Coriolis forces.

When the flow direction is reversed so that the fluid enters at the center and exits at the periphery of the rotor, as in the pump mode, the inner vane elements 310 decouple the flexure region from the incoming material viscous drag while the outer vane elements 308 reverse their functions so that the inner vane elements 310 accelerate the fluid prior to entering the flexure region and the outer vane elements 308 isolate the flexure region from the viscous drag to which the rotor exterior is subject.

Elements 502, 504, 507 and 505 of each V-shaped leg of FIG. 5 perform similar shear and acceleration decoupling functions so that wall 503 is subjected only to Coriolis forces.

MOTOR DRIVEN PUMP/FLOWMETER

The flowmeter of the present invention may be operated to perform the dual function of a pump and a Coriolis Flowmeter for measuring the mass flow rate of the material output of the pump. When operated in this manner, the material enters the flowmeter of FIG. 3 at outlet 304 which, in this case, comprises the material inlet. The material flows downward as shown on FIG. 3, and radially outward through flow channels 309 and exits the flowmeter/pump assembly at inlet 302 which, in this case, comprises the material outlet of the flowmeter/pump assembly. The torque necessary to operate the assembly as a pump is supplied by motor 325 which is connected to axle 331 and in turn, rotor assembly 307. The clockwise rotation of the rotor assembly 307 (as viewed from the top on FIG. 3) about axel 331 causes the material received by inlet 304 to flow outwardly radially through flow channels 309 and out of outlet port 302.

The flow of material outward from the center portion of rotor assembly 307 causes each elemental portion of the material in the flow channels 309 to assume an increasing tangential velocity. This tangential acceleration exerts a force on the walls of the elements defining flow channels 309. This includes the walls 310b of inner vane 310, wall 403 of flexure element 312 and wall 308b of outer vane 308. These walls provide the force necessary to impart the required increased tangential velocity to the material. This force on the walls 403 of flexure element 402 causes the wall to lag the rotation of the walls 308b of element 308. In so doing, the walls 403 assume an angular displacement from the wall 308b. Magnets 323 and 324 detect the magnitude of the flexure of walls 308b to determine the mass flow rate of the material within the mass flowmeter/pump assembly. This offset is indicative of the mass flow rate of the material delivered by the pump to an external pipe line, or the like to which exit port 302 is connected.

DESCRIPTION OF FIG. 9

Figure 9:
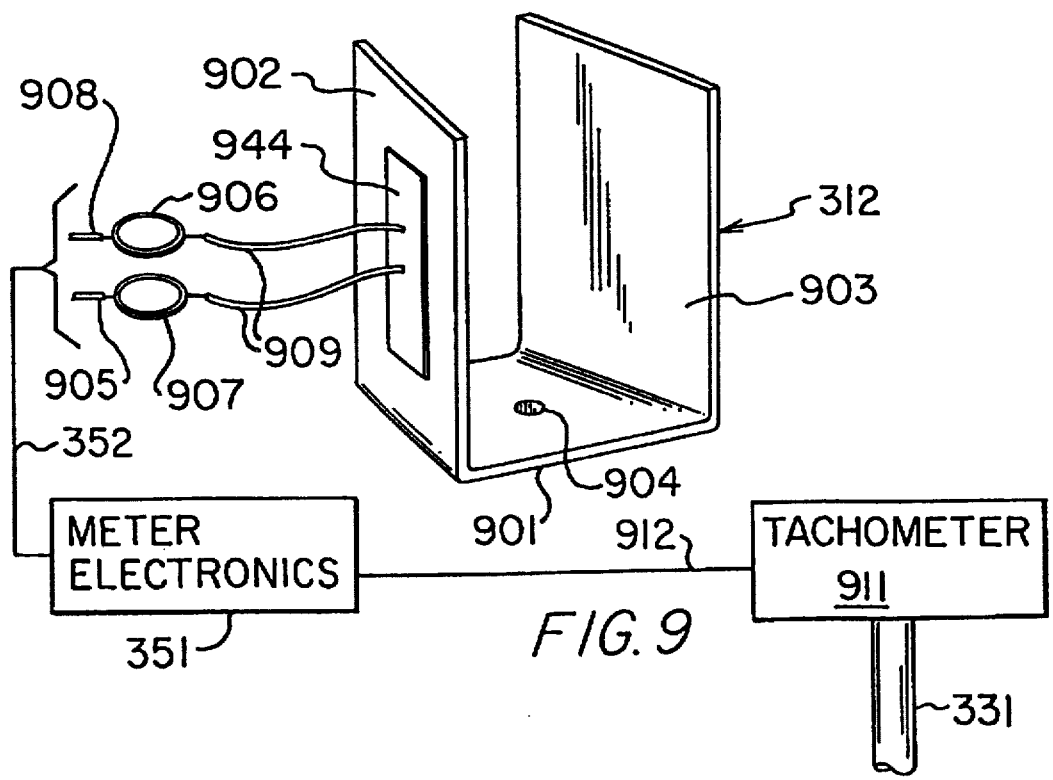
FIG. 9 discloses a strain gauge flexure element.

FIGS. 3, 4, 5, and 6 disclose magnets 344 positioned on flexure elements 312 and 503 and magnets 316 positioned on the bottom of the rotor assembly 307. The magnets cooperate with coils 323 and 324 to generate sinusoidal waves whose time displacement with respect to each other is indicative of the mass flow rate of the material flowing through flow channels 309. FIG. 9 discloses an alternative flexure element wherein a strain gauge 944 mounted on side wall 902 generates output signals indicative of the magnitude of flexure of side wall 902 in response to the generated Coriolis forces. These output signals, in conjunction with the rotor assembly RPM as shown in equation 14, are also indicative of the mass flow rate of the material flowing in flow channels 309.

Flexure element 312 of FIG. 9 and its strain gauge 944 is an alternative to the flexure element 312 and its magnet 344 of FIG. 6. The output of the strain gauge 944 is extended over conductors 909, slip rings 906 and 907, conductors 908 and 905 and path 352 to meter electronics 351. Meter electronics 351 responds to the received signals from strain gauge 944 and tachometer 911 via path 912 and generates mass flow and other output information in a manner analogous to that in which it responded to the phase difference between the signals from coils 323 and 324. Tachometer 911 is connected to axle 331 of FIG. 3 to generate the RPM information required when a strain gauge is used as a sensor.

When a mass flow meter is operated with the strain gauge flexures 312 of FIG. 9, motor 325 on FIG. 3 is not needed for calibration purposes since the strain gauge flexure 312 may be calibrated for a zero flow condition by adjusting meter electronics 351 when rotor assembly 307 is not rotating. Meter electronics 351 may be internally adjusted to cancel any residual output signal that may be generated by strain gauge 944 when rotor assembly 307 is stationary. The motor 325 of FIG. 3, of course, would be required to spin rotor assembly 307 having a strain gauge flexure element 312 when the flowmeter is operated as a pump.

The strain gauges 944 may be of the piezo-electric type which generate an output signal whose amplitude is proportional to the flexing of the strain gauge element 944. Alternatively, strain gauge element 944 may comprise a resistive type of strain gauge whose resistance varies with the bending. Either type of strain gauge may be used with accordance with the present invention and when so used will enable meter electronics 351 to receive output signals representative of the degree of flexing of the flexure element and, in turn, the mass flow rate of the material flowing through flow channels 309.

DESCRIPTION OF FIG. 10

In the embodiment of FIGS. 3 through 9, flow channels 309 are radial and extend between the center portion 340 of the rotor assembly 307 and the outer periphery of the rotor assembly.

Since the flow channels 309 of FIG. 4 are defined by the spacing between adjacent ones of vane elements 320, the walls of these vane elements, including outer vane element 308, are also radial. A rotor assembly having radial flow channels operates as described when element 302 on FIG. 3 is an inlet and element 304 is as an outlet. When so operated, material flows into the flowmeter at opening 327 of inlet 302, flows through inwardly in flow channels 309 to the center portion 340 of the flowmeter and then upwardly through opening 337 and exits the flowmeter at outlet 304. When operated in this manner, the axial momentum of the fluid of the material entering the flowmeter causes an angular rotation of rotor assembly 307 as the material enters the outer portion of each flow channel 309 and travels inwardly towards the center of the flowmeter.

The embodiment of FIGS. 3 through 9 can only be operated as a flowmeter when element 302 is an inlet and element 304 is the outlet or in the pump mode when 302 is an inlet and 304 is an outlet. This limitation exists because it is the momentum of the incoming fluid to that imparts rotation to rotor assembly 307.

The embodiment of FIGS. 3 through 9 cannot be operated as a flowmeter in the reverse direction with element 304 being the inlet and element 302 being the outlet without a motor for spinning the rotor assembly 307. The reason for this is that the movement of the flowing material in this direction would not generate the forces required to rotate rotor assembly 307. In such an embodiment, the material enters opening 337 of element 304, proceeds downwardly to the center portion of the flowmeter rotor assembly 307 and from there flows outwardly in a radial path to the periphery of the rotor assembly and from there flows through opening 327 of element 302. The movement of the material outwardly through flow channels 309 in a radial manner does not exert any angular forces on the walls of vanes 320 on FIG. 3.

Figure 10:
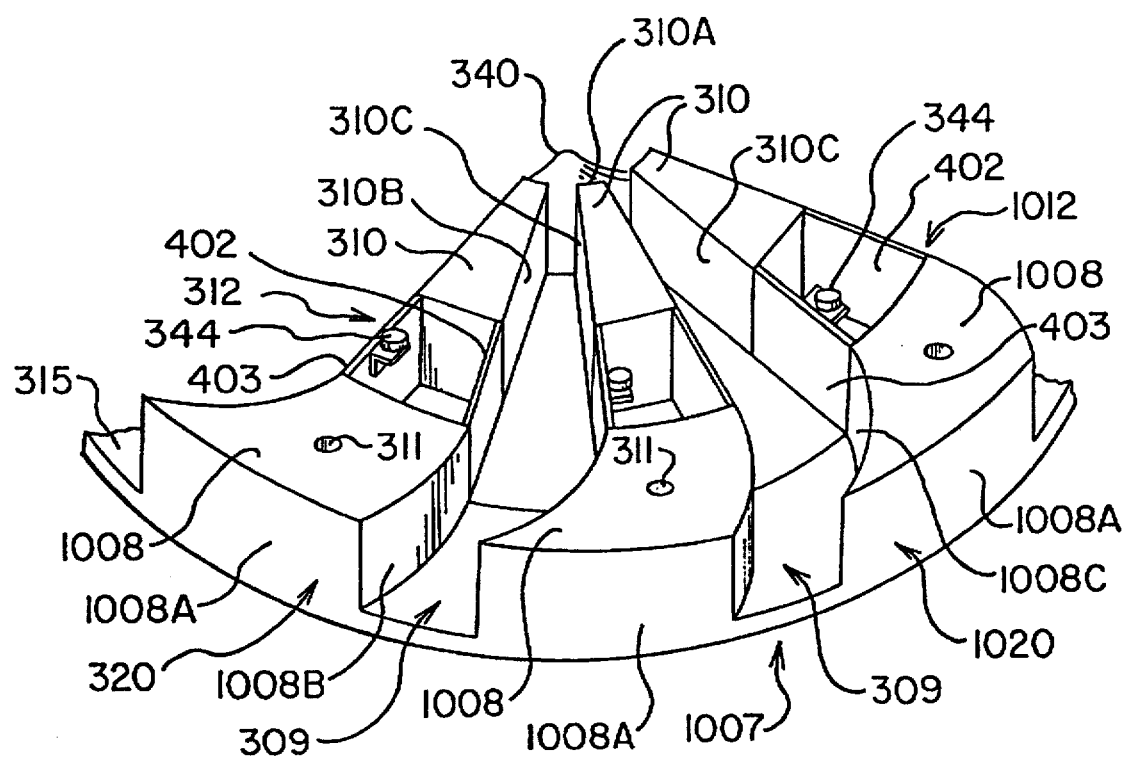
FIG. 10 discloses a rotor assembly that may be operated with either direction of material flow.

FIG. 10 discloses an alternative embodiment of a rotor assembly 1007 comparable to rotor assembly 307 of FIG. 3 which can function as a mass flowmeter for either direction of material flow. In accordance with this embodiment, a flowmeter having a rotor assembly of the type shown in FIG. 10 may be operated with element 302 as the inlet and element 304 as the outlet or, alternatively, may be operated in a reverse direction wherein the material enters element 304, flows outwardly through the flow channels 309 of the rotor assembly of FIG. 10 and exits the flowmeter at element 302.

The rotor assembly of FIG. 10 is similar to that shown on FIG. 4 except for the fact that the outer vane elements 1008 on FIG. 10 are shown to have radially curved walls. The inner vane elements 310 and the flexure elements 312 are identical to the correspondingly designated inner vane elements and flexure elements of FIG. 4. However, the outer vane elements 308 on FIG. 4 together with its straight radial walls are replaced by the outer vane elements 1008 having curved walls 1008C and 1008B on FIG. 10. The curvature of these walls is such that material flowing outwardly from the center portion 340 of the rotor assembly generate forces on the walls 1008C of the outer vane elements 1008 to cause the rotor assembly to move in a counter clock-wise direction as shown on FIG. 10. A rotor assembly of the type shown on FIG. 10, when comprising a part of a flowmeter structure of the type shown on FIG. 3, permits the flowmeter to function when element 302 is the inlet and element 304 is the outlet. The curved walls 1008C of outer vane elements 1008 also permit a flowmeter using the rotor assembly of FIG. 10 to be operated in a manner wherein material enters the flowmeter at element 304, flows downwardly to the center of the rotor assembly, and then flows radially outwardly to the periphery of the rotor assembly and exits the flowmeter at element 302. With material flow in this direction, the forces imparted by the flowing material to walls 1008C of outer vane elements 1008 cause the rotor assembly 1007 to rotate in a counter clock-wise direction to generate output signals that can be used to derive the mass flow rate and other information for the material flowing within the flowmeter.

It is to be expressly understood that the claimed invention is not to be limited to the description of the preferred embodiment but encompasses other modifications and alterations within the scope and spirit of the inventive concept.

We claim:

1. A Coriolis flowmeter comprising:

a material containment housing;

an inlet on said material containment housing for applying material received by said inlet to the interior of said material containment housing;

an outlet on said material containment housing for enabling said material to exit said housing;

a rotor assembly positioned within said housing and having an axis of rotation, said rotor assembly including;

a rotor plate having a center portion, an outer perimeter and a face substantially perpendicular to said axis of rotation;

Coriolis detection means affixed to said face;

a plurality of flow channels each of which extends radially between said outer perimeter of said rotor plate and said center portion of said rotor plate;

said rotor assembly including means responsive to the receipt of said material by said inlet for extending said material through said flow channels to said outlet;

said rotor assembly being effective to rotate about said axis of rotation using energy derived from said material while said material is extended through said flow channels;

said Coriolis detection means being effective for moving over an arcuate path with respect to said rotor plate in response to Coriolis forces generated when said material is extended through said flow channels of said rotating rotor assembly;

means for detecting said arcuate movement of said Coriolis detecting means; and means for providing output signals indicative of said movement of said Coriolis detecting means and, in turn, of a mass flow rate of said material.

2. The Coriolis flowmeter of claim 1 wherein said Coriolis detection means comprise a plurality of wedge shaped vanes affixed to said face of said rotor plate with said vanes being spaced apart from each other to define said flow channels positioned intermediate respective ones of said vanes.

3. The Coriolis flowmeter of claim 2 wherein each of said wedge shaped vanes comprises:

a radially outward vane element, a flexure, and a radially inward vane element;

said radially outward vane element having an outer surface and an inner surface, said outer surface being flush with said outer perimeter of said rotor plate;

said radially inward vane element having an innermost surface at said center portion of said rotor plate and further having an outermost surface spaced apart from said inner surface of said radially outward vane element; and a flexure positioned between said inner surface of said radially outward vane element and said outermost surface or said radially inward vane element;

said flexure comprising said Coriolis detection means.

4. The Coriolis flowmeter of claim 3 wherein said radially outward vane element has side walls curved in a radial outward direction so that said rotor assembly rotates about said axis of rotation when said material flows outwardly from said center portion through said flow channels.

5. The Coriolis flowmeter of claim 3 wherein said flexure of said Coriolis detection means comprises a substantially U-shaped channel member having a substantially flat lower member connecting a pair of upwardly extending side legs, said lower member being affixed to said face of said rotor plate, said side legs defining a portion of said flow channels; and sensor means affixed to at least one of said legs for indicating an arcuate movement of said leg between a first position and a second position in response to said movement of said Coriolis detection means.

6. The Coriolis flowmeter of claim 5 wherein said sensor means is a magnet.

7. The Coriolis flowmeter of claim 5 wherein said sensor means is a strain gauge.

8. The Coriolis flowmeter of claim 1 wherein said Coriolis detection means comprises a plurality of substantially V-shaped vanes affixed to said face of said rotor plate, each of said V-shaped vanes being spaced apart to define said flow channels intermediate respective ones of said vanes.

9. The Coriolis flowmeter of claim 8 wherein each of said V-shaped vanes comprise:

a first leg and a second leg with each of said legs further comprising;

a radially outward element, a flexure element, and a radially inward element;

said radially outward element having an outer edge and an inner edge with said outer edge being flush with said outer periphery of said rotor plate;

said radially inward element having an innermost edge at said center portion of said rotor plate and further having an outermost edge spaced apart from said inner edge of said radially inward element;

said flexure element being positioned intermediate said inner edge of said radially outward element and said outermost edge of said radially inward element;

said flexure element being effective for moving in an arcuate path with respect to said face between a first and a second position in response to said generated Coriolis forces.

10. The Coriolis flowmeter of claim 9 wherein each of said legs has a first slit and a second slit each extending vertically from a top edge of said leg to a lower portion of said leg proximate said face of said rotor plate;

said first slit being intermediate said radially outward element and said flexure element;

said second slit being intermediate said flexure element and said radially inward element.

11. The Coriolis flowmeter of claim 10 wherein said means for detecting includes a magnet affixed to said flexure element for indicating an arcuate movement of said flexure element with respect to said face.

12. The Coriolis flowmeter of claim 1 wherein said rotor assembly includes a motor for rotating said rotor assembly.

13. The Coriolis flowmeter of claim 1 wherein said means for detecting and said means for providing said output signals comprises:

a first coil positioned on said material containment housing and a second coil positioned on a cover of said housing; and magnets positioned on said rotor plate and on said Coriolis detection means;

said coils and said magnets being positioned for generating periodic output signals having a phase difference indicative of said movement of said Coriolis detection means between a first position and a second position.

14. The Coriolis flowmeter of claim 13 wherein:

said first coil comprises a fixed coil and said second coil comprises a movable coil;

said magnets comprise a first set of magnets mounted on said Coriolis detection means and a second set of magnets affixed to said rotor plate.

15. The Coriolis flowmeter of claim 1 wherein said rotor plate comprises a disc like end element and wherein said Coriolis flowmeter further comprises:

a circular rotor cover plate;

means mounting said rotor cover plate to said rotor assembly to prevent a cross flow of material between said flow channels; and structure defining a hole in said rotor cover plate for connecting to said material outlet;

said Coriolis detection means including a plurality of vanes with each vane comprising a means for decoupling the rotational velocity of said material in said flow channels from a shear effect caused by the non rotational state of said material in said material outlet of said Coriolis flowmeter.

16. The Coriolis flowmeter of claim 1 wherein said flow channels include:

material shear decoupler means mounted on said rotor assembly intermediate said material inlet and said material outlet;

said material sheer decoupler means being effective for rotating about said axis or rotation in unison with said outer rotor;

means on said material shear decoupler means for receiving a rotating radial material flow from said material inlet;

means on said material shear decoupler means for converting said rotating radial material flow to an axial flow; and means on said material shear decoupler means for applying said axial material flow to said material outlet.

17. The Coriolis flowmeter of claim 1 wherein said flowmeter further comprises:

a motor connected to said rotor assembly for rotating said assembly rotor about said axis of rotation at an increased rate;

said rotor assembly being responsive to said increased rotation for increasing the flow of said material in said flow channels and, in turn, a the throughput of said material through said flowmeter.

18. The Coriolis flowmeter of claim 1 wherein said flowmeter further comprises:

a motor for rotating said rotor assembly about said axis of rotation;

said flaw channels and said rotor assembly being responsive to said extension or said material and said rotation or said rotor assembly to effect a pumping action that pumps said material in said flow channels to said material outlet;

said means for providing output signals being effective to generate signals indicative or the mass flow rate of said material pumped by said rotor assembly.

19. A Coriolis flowmeter comprising:

a rotor housing having an inlet and an outlet a rotor assembly positioned within said housing and having a central axis of rotation, said rotor assembly including a plate having an outer perimeter and a face substantially normal to said axis of rotation, and a plurality of flexible vanes each rising from said face along a line extending from said central axis or rotation to said outer perimeter;

means for flowing material across said rotor between said inlet and said outlet to induce flexion in said vanes responsive to Coriolis forces in said material concomitant with rotation of said rotor assembly;

means for detecting a magnitude of said flexion due to said Coriolis forces; and means for deriving a mass flow rate from said detection of said magnitude.

20. The Coriolis flowmeter as set forth in claim 19 wherein said flowing means includes a plurality of flow channels interposed between said vanes.

21. The flowmeter as set forth in claim 20 wherein said flow channels have a wedge shape.

22. The flowmeter as set forth in claim 19 wherein said detecting means includes at least one of strain gauge, said at least one strain gauge coupled with corresponding at least one of said vanes for detecting said magnitude.

23. The flowmeter as set forth in claim 22 wherein said at least one strain gauge have a center of rotation coaxial with said central axis of rotation.

24. The flowmeter as set forth in claim 19 wherein said deriving means includes meter electronics having means for producing signals indicative of said magnitude.

25. The flowmeter as set forth in claim 24 wherein said deriving means includes means for receiving said signals to derive said mass flow rate.

26. A method of operating a Coriolis flowmeter comprising the steps of:

providing a flowmeter including a rotor assembly having a plurality of flow channels and further having an axis of rotation, means proximate said flow channels for flexing to assume an angular offset in response to Coriolis forces generated as material flows through said flow channels and means for generating signals representative of flexion in said means for flexing, said method comprising the steps of:

flowing material through said flow channels;

using energy derived from said material while said material flows through said flow channels to rotate said rotor assembly around said axis of rotation;

producing flexion in said flexing means by the action of Corolis forces concominant with rotation of said rotor assembly around said axis of rotation;

generating signals representative of said flexion; and processing said signals to derive flow information pertaining to said material.

27. The method of claim 26 wherein said processing step includes a step of deriving mass flow rate information from said signals.

28. The method of claim 27 wherein said generating means includes a second plurality of magnets inflexibly mounted to a bottom surface of said rotor assembly and a second coil means operably configured to detect a location of said second plurality of magnets;

and said generating step includes a step of comparing a shift between said position of said first plurality of magnets and said location of said second plurality of magnets.

29. The method or claim 28 wherein said comparing step includes a step of determining an offset between respective sine wave signals produced by said first coil means and said second coil means.

30. The method of claim 26 wherein said generating means includes a first plurality of magnets and a first coil means operably configured to detect a position of said first plurality of magnets, at least a portion of said first plurality of magnets being attached to a flexible wall; and said flowing step includes flexing said wall responsive to Coriolis forces generated by said material to move said first plurality of magnets.

31. The method of claim 26 wherein said rotor assembly includes a plurality of radially extending vanes, each vane including a central flexure member intermediate a radially inward member, and a radially outward member, and said flowing step includes flexing said central flexure member responsive to said Coriolis forces.

32. The method of claim 26 in combination with the step of:

operating a motor connected to said rotor assembly for rotating rotor assembly about said axis of rotation at an increased rate; and said rotor assembly being responsive to said rotation to effect a pumping action of said material in said flow channels and, in turn, an increased throughput of said material through said Corolis flowmeter.

33. A Corolis flowmeter comprising:

a housing including an inlet and an outlet;

a rotor having a radially outboard margin and a radially inboard margin;

means defining a flow channel extending from said inlet to said outlet, and across said rotor between radially outboard margin and said radially inboard margin, said flow channel defining means including means for rotating said rotor using energy derived from material while said material is flowing through said flow channel from said inlet to said outlet; and a torsional member connected to said rotor and including means, responsive to forces in said flowing material, for flexing to provide an angular offset in rotation of said torsional member with respect to rotation of said rotor, said angular offset of said torsional member representing a rate of material flow through said flow meter from said inlet to said outlet; and means for detecting said angular offset of said torsional member to derive flow information for said material.

* * * * *